(12) United States Patent
Mu

(10) Patent No.: US 12,513,674 B2
(45) Date of Patent: Dec. 30, 2025

(54) FREQUENCY DIVISION MULTIPLEXING METHOD, FREQUENCY DIVISION MULTIPLEXING DEVICE, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 424 days.

(21) Appl. No.: 18/013,993

(22) PCT Filed: Jul. 17, 2020

(86) PCT No.: PCT/CN2020/102785
§ 371 (c)(1),
(2) Date: Dec. 30, 2022

(87) PCT Pub. No.: WO2022/011703
PCT Pub. Date: Jan. 20, 2022

(65) Prior Publication Data
US 2023/0292366 A1  Sep. 14, 2023

(51) Int. Cl.
*H04W 72/0453* (2023.01)
*H04W 74/0833* (2024.01)

(52) U.S. Cl.
CPC ... *H04W 72/0453* (2013.01); *H04W 74/0833* (2013.01)

(58) Field of Classification Search
CPC .......... H04W 74/0833; H04W 72/0453; H04L 5/0007
See application file for complete search history.

(56) References Cited

U.S. PATENT DOCUMENTS

| | | |
|---|---|---|
| 2017/0280484 A1 | 9/2017 | Awad |
| 2018/0049068 A1 | 2/2018 | Agiwal et al. |
| 2020/0053811 A1 | 2/2020 | Ang et al. |
| 2021/0058971 A1* | 2/2021 | MolavianJazi ...... H04B 17/318 |
| 2021/0329718 A1* | 10/2021 | Hu ........................ H04L 1/0061 |
| 2022/0408491 A1* | 12/2022 | Liu ........................ H04L 5/0048 |
| 2023/0129299 A1* | 4/2023 | Ohara ............... H04W 74/0866 370/329 |

(Continued)

FOREIGN PATENT DOCUMENTS

| | | |
|---|---|---|
| CN | 107079482 A | 8/2017 |
| CN | 109428700 A | 3/2019 |

(Continued)

OTHER PUBLICATIONS

Samsung. "Considerations on access barring and UE capability" 3GPP TSG RAN WG1 #101 R1-2003913, Jun. 5, 2020, sections 1-5. pp 2.

(Continued)

*Primary Examiner* — Yu-Wen Chang
(74) *Attorney, Agent, or Firm* — Volpe Koenig

(57) ABSTRACT

A frequency-division multiplexing method includes: determining a first parameter, where the first parameter is configured to determine a total bandwidth occupied by physical random access channels for performing frequency-division multiplexing.

19 Claims, 3 Drawing Sheets

S11

Determine a first parameter, where the first parameter is configured to determine a total bandwidth occupied by physical random access channels for performing frequency-division multiplexing

(56) References Cited

U.S. PATENT DOCUMENTS

| | | | | |
|---|---|---|---|---|
| 2023/0132057 A1* | 4/2023 | Jang | .................. | H04W 74/0833 |
| | | | | 370/329 |
| 2023/0133904 A1* | 5/2023 | Turtinen | ............ | H04W 74/006 |
| | | | | 370/329 |
| 2023/0217498 A1* | 7/2023 | Lee | ................... | H04W 74/0833 |
| | | | | 370/329 |
| 2023/0284276 A1* | 9/2023 | Mu | ................... | H04W 74/0891 |
| | | | | 370/329 |
| 2024/0008050 A1* | 1/2024 | Zhou | .................. | H04W 72/231 |
| 2024/0389152 A1* | 11/2024 | Höglund | ............... | H04W 48/12 |

FOREIGN PATENT DOCUMENTS

| | | |
|---|---|---|
| CN | 109565876 A | 4/2019 |
| CN | 111201740 A | 5/2020 |

OTHER PUBLICATIONS

ZTE. "Discussion on UE categories for reduced capability NR devices" 3GPP TSG RAN WG1 Meeting #101 R1-2003804, Jun. 5, 2020, entire document. pp. 5.

Ericsson. "Higher-layer aspects for Redcap" 3GPP TSG-RAN WG1 Meeting #101-e R1-2003292, Jun. 5, 2020, entire document. pp. 7.

\* cited by examiner

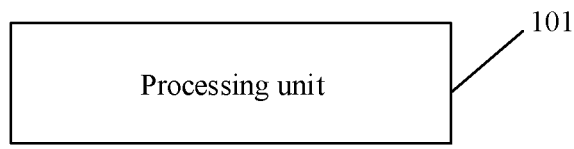
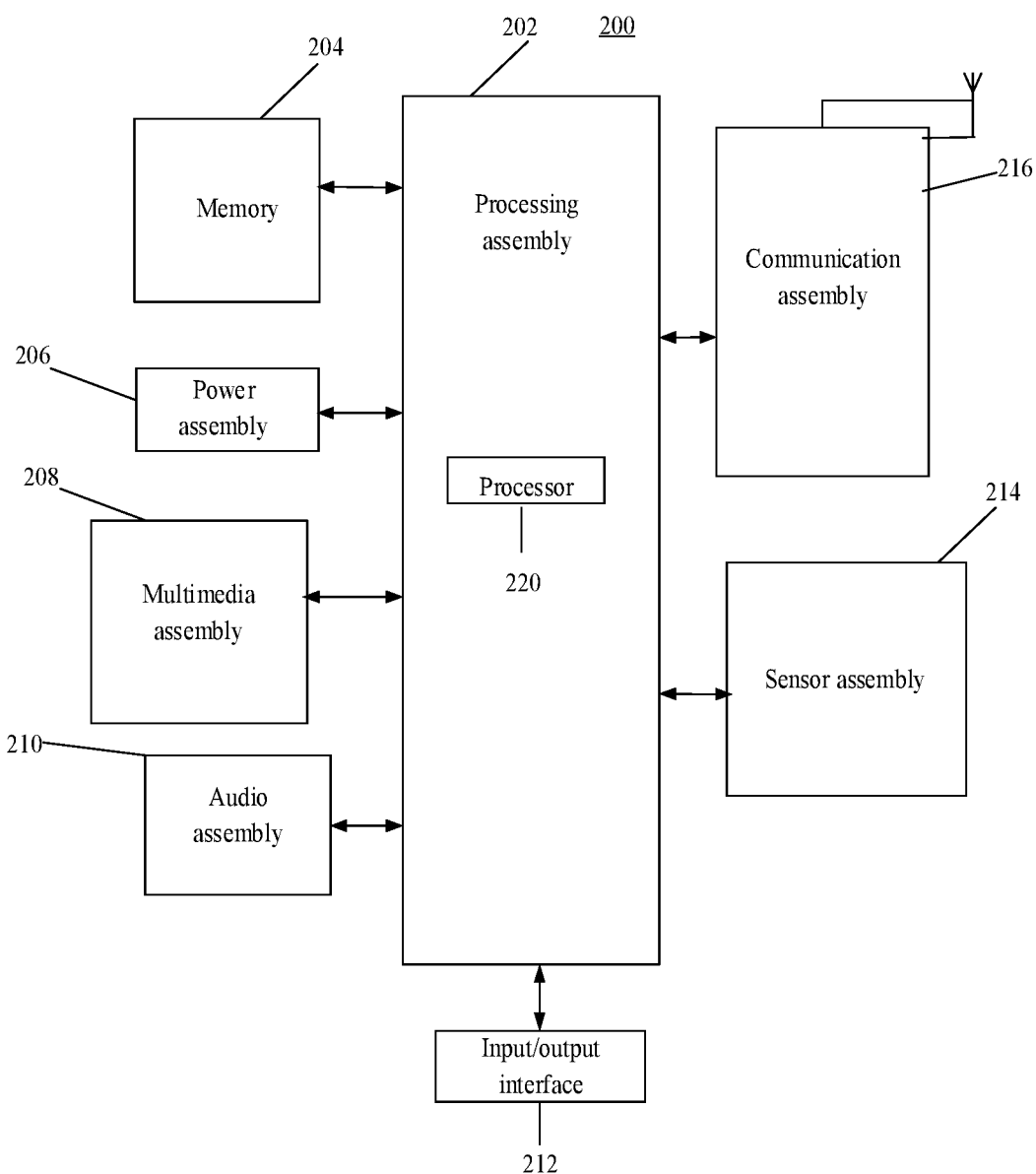

FREQUENCY DIVISION MULTIPLEXING METHOD, FREQUENCY DIVISION MULTIPLEXING DEVICE, AND STORAGE MEDIUM

CROSS REFERENCE TO RELATED APPLICATIONS

The present application is a U.S. National Stage of International Application No. PCT/CN2020/102785, filed on Jul. 17, 2020, the entire content of which is incorporated herein by reference for all purposes.

BACKGROUND

Owning to sustained development in Internet of Things services, video surveillance, smart homes, wearable devices, industrial sensor monitoring, etc. have been popularized. These services usually require a high rate of several tens of Mbps to 100 Mbps, and also have relatively high requirements for delay, which cannot be achieved by machine type communication (MTC) and narrow band internet of thing (NB-IoT) in the related technologies. To this end, it is proposed to design a new type of terminal in the 5G New Radio (NR) to meet the requirements of semi-high-end IoT devices. Such a new type of terminal is called reduced capability UE or NR-lite for short in the current 3GPP standard.

SUMMARY

According to a first aspect of examples of the disclosure, a frequency-division multiplexing method is provided. The frequency-division multiplexing method includes: determining a first parameter, where the first parameter is configured to determine a total bandwidth occupied by physical random access channels for performing frequency-division multiplexing.

According to a second aspect of the examples of the disclosure, a frequency-division multiplexing apparatus is provided. The frequency-division multiplexing apparatus includes:
  a processor; and
  a memory configured to store an instruction executable by the processor;
  where the processor is configured to determine a first parameter, where the first parameter is configured to determine a total bandwidth occupied by physical random access channels for performing frequency-division multiplexing.

According to a third aspect of the examples of the disclosure, a non-transitory computer-readable storage medium is provided, when an instruction in the storage medium is executed by a processor, the processor may be caused to determine a first parameter, where the first parameter is configured to determine a total bandwidth occupied by physical random access channels for performing frequency-division multiplexing.

It should be understood that the above general description and the following detailed description are merely for illustrative and explanatory, and may not limit the disclosure.

BRIEF DESCRIPTION OF THE DRAWINGS

The drawings here are incorporated into the description as a constituent part of the description, illustrate examples conforming to the disclosure, and serve to explain principles of the disclosure along with the description.

FIG. 3 is a block diagram of a frequency-division multiplexing apparatus according to an example.

FIG. 4 is a block diagram of a frequency-division multiplexing apparatus according to an example.

DETAILED DESCRIPTION

Examples will be described in detail here, instances of which are illustrated in accompanying drawings. When the following description refers to the accompanying drawings, the same numbers in different accompanying drawings represent the same or similar elements unless otherwise indicated. Implementations described in the following examples do not represent all examples consistent with the disclosure. On the contrary, they are merely examples of apparatuses and methods consistent with some aspects of the disclosure as detailed in the appended claims.

In the related technologies, a plurality of physical random access channels (PRACH) can be used for performing frequency-division multiplexing (FDM) in the same time unit. With different combination of subcarrier spacing (SCS) of the PRACHs and subcarrier spacing of physical uplink shared channels (PUSCHs), each PRACH respectively occupies different frequency domain widths. In the NR system, PRACHs with FDM factors of 1, 2, 4 and 8 can be used for performing FDM. Different FDM factors correspond to respective frequency domain bandwidths.

The receiving frequency domain bandwidth for the reduced capability UE will be limited. For example, the maximum receiving bandwidth is 20 MHz in Frame Relay (FR) 1, and is possibly 50 MHz or 100 MHz in FR2. For the reduced capability UE with the receiving frequency domain bandwidth limited, a frequency domain bandwidth corresponding to traditional PRACH FDM may exceed the maximum limited frequency domain bandwidth.

Figure 1:
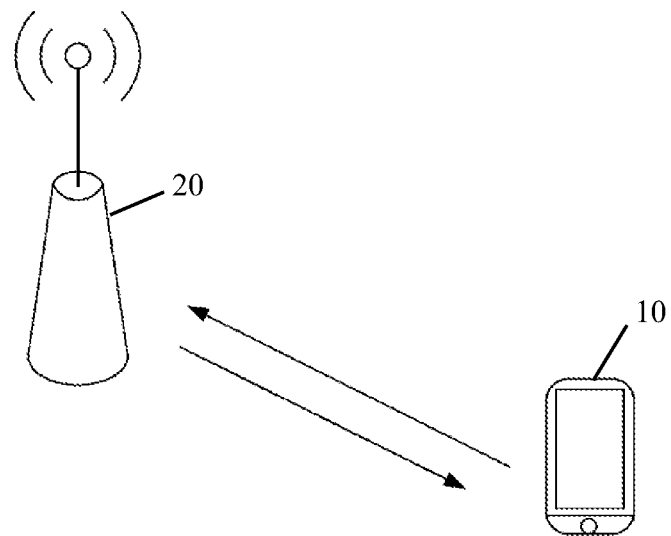
FIG. 1 is an architecture diagram of a wireless communication system according to an example.

An access method provided in an example of the disclosure may be used in a wireless communication system as shown in FIG. 1. With reference to FIG. 1, the wireless communication system includes a terminal 10 and a network device 20. The terminal transmits or receives information to or from the network device through a wireless resource.

It may be understood that the wireless communication system as shown in FIG. 1 is described illustratively and may also include other network devices, for instance, core network devices, radio relay devices, radio backhaul devices, etc., which are not depicted in FIG. 1. An example of the disclosure does not limit a number of the network devices and a number of the terminals included in the wireless communication system.

It may be further understood that the wireless communication system according to the example of the disclosure is a network providing a wireless communication function. The wireless communication system may use different communication technologies, for instance, code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. Networks may be classified into 2nd generation (2G) networks, 3G networks, 4G networks, or future evolved networks (for instance, 5G networks) according to factors of capacity, rate, latency, etc. of different networks. The 5G networks may also be referred to as new radio (NR) networks. For convenience of description, the disclosure refers to a wireless communication network simply as a network.

Further, the network device involved in the disclosure may also be referred to as a wireless access network device. The wireless access network device may be a base station, an evolved node B (base station), a home base station, an access point (AP) in a wireless fidelity (WIFI) system, a radio relay node, a radio backhaul node, a transmission point (TP), a transmission and reception point (TRP), etc., may be a gNB in an NR system, or may be a component or a part of devices constituting a base station, etc. In a vehicle-to-everything (V2X) communication system, the network device may also be a vehicle-mounted device. It is to be understood that the example of the disclosure does not limit specific technologies and types of devices used by the network device.

Further, a terminal involved in the disclosure may also be referred to as a terminal device, user equipment (UE), a mobile station (MS), a mobile terminal (MT), etc., and is a device that provides a user with voice connectivity and/or data connectivity. For instance, the terminal may be a handheld device, a vehicle-mounted device, etc. which has a radio connection function. Some instances of the terminals include a mobile phone, a pocket personal computer (PPC), a palmtop computer, a personal digital assistant (PDA), a laptop computer, a tablet computer, a wearable device, a vehicle-mounted device, etc. Moreover, in the vehicle-to-everything (V2X) communication system, the terminal device may also be a vehicle-mounted device. It is to be understood that the example of the disclosure does not limit specific technologies and types of devices used by the terminal.

The terminal involved by the example of the disclosure may be understood as a new type of terminal designed in the 5G NR: reduced capability UE or NR-lite for short. In the example of the disclosure, the new terminal is called 5G NR-lite.

Similar to Internet of Thing (IoT) devices in long term evolution (LTE), 5G NR-lite usually needs to satisfy the following requirements:

low cost and complexity.
coverage enhancement to some extent.
power saving.

As the current NR system is designed for high-end terminals with high rate and low delay, current design may not satisfy the above requirements of NR-lite. As a result, the current NR system needs to be improved to satisfy the requirements of NR-lite. For example, in order to satisfy the requirements for low cost and complexity, a radio frequency (RF) bandwidth of NR-IoT may be limited to, for example, 5 MHz or 10 MHz, or a size of NR-lite's buffer may be limited, and then a size of a transmission block received each time is further limited. As for power saving, improvement may be performed by simplifying communication flows and reducing the number of times NR-lite terminal detects downlink control channels.

In the related technologies, a plurality of PRACHs may be used for performing FDM in the same time unit. Corresponding PRACHs are selected by the terminal according to SSB measured. In the NR system, PRACHs with FDM factors of 1, 2, 4 and 8 can be used for performing FDM.

Different FDM factors correspond to respective frequency domain bandwidths. Under different FDM factors, frequency domain bandwidths needed are shown in Table 1 below.

TABLE 1

| SCS of PRACH | SCS of PUSCH | Bandwidth occupied by each PRACH (RB in term of PUSCH) | Total bandwidth occupied the PRACHs (MHz) | | | |
|---|---|---|---|---|---|---|
| | | | FDM = 1 | FDM = 2 | FDM = 4 | FDM = 8 |
| 1.25 | 15 | 6 | 1.08 | 2.16 | 4.32 | 8.64 |
| 1.25 | 30 | 3 | 1.08 | 2. 16 | 4.32 | 8.64 |
| 1.25 | 60 | 2 | 1.08 | 2.16 | 4.32 | 8.64 |
| 5 | 15 | 24 | 4.32 | 8.64 | 17.28 | 34.56 |
| 5 | 30 | 12 | 4.32 | 8.64 | 17.28 | 34.56 |
| 5 | 60 | 6 | 4.32 | 8.64 | 17.28 | 34.56 |
| 15 | 15 | 12 | 2.16 | 4.32 | 8.64 | 17.28 |
| 15 | 30 | 6 | 2.16 | 4.32 | 8.64 | 17.28 |
| 15 | 60 | 3 | 2.16 | 4.32 | 8.64 | 17.28 |
| 30 | 15 | 24 | 4.32 | 8.64 | 17.28 | 34.56 |
| 30 | 30 | 12 | 4.32 | 8.64 | 17.28 | 34.56 |
| 30 | 60 | 6 | 4.32 | 8.64 | 17.28 | 34.56 |
| 60 | 60 | 12 | 8.64 | 17.28 | 34.56 | 69.12 |
| 60 | 120 | 6 | 8.64 | 17.28 | 34.56 | 69.12 |
| 120 | 60 | 24 | 17.28 | 34.56 | 69.12 | 138. 24 |
| 120 | 120 | 12 | 17.28 | 34.56 | 69.12 | 138. 24 |

With different combination of subcarrier spacing of the PRACHs and subcarrier spacing of PUSCHs, each PRACH respectively occupies different frequency domain widths.

The receiving frequency domain bandwidth for the reduced capability UE will be limited. For the reduced capability UE with the receiving frequency domain bandwidth limited, a frequency domain bandwidth corresponding to traditional PRACH FDM may exceed the maximum limited frequency domain bandwidth, such that configuration of the traditional PRACH FDM may not match capability of the reduced capability UE.

The example of the disclosure provides a frequency-division multiplexing method. In the frequency-division multiplexing method, a total bandwidth of PRACHs for performing frequency-division multiplexing (PRACH FDM) is determined, such that configuration of the PRACH FDM matches capability of a terminal.

It may be understood that "PRACHs for performing frequency-division multiplexing" and "PRACH FDM" are sometimes used interchangeably in the examples of the disclosure, but those skilled in the art need to understand the consistency of their meanings.

Further, in the example of the disclosure, for the convenience of description, parameter configured to determine the total bandwidth of PRACHs for performing frequency-division multiplexing are referred to as first parameter.

Figure 2:
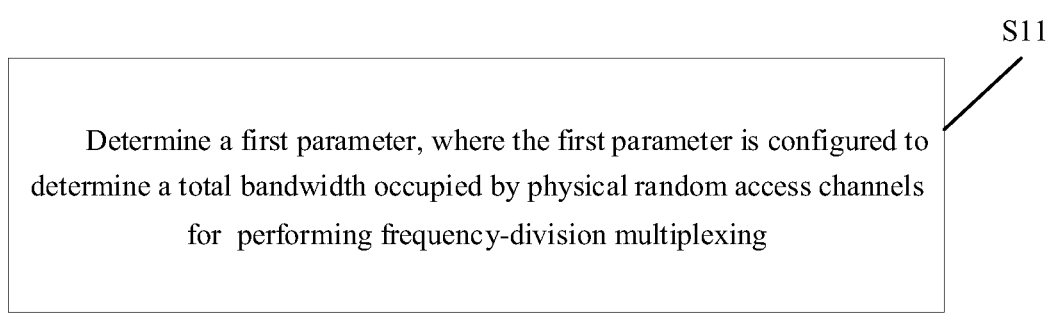
FIG. 2 is a flowchart of a frequency-division multiplexing method according to an example.

FIG. 2 is a flowchart for implementing a frequency-division multiplexing method illustrated according to an example. As shown in FIG. 2, the frequency-division multiplexing method includes:

S11, a first parameter is determined, where the first parameter is configured to determine a total bandwidth occupied by PRACHs for performing frequency-division multiplexing.

Technical solutions provided by the examples of the disclosure may have the following beneficial effects: configuration of the physical random access channels for performing frequency-division multiplexing may match a capability of a terminal by means of configuring the first parameter for limiting the bandwidth occupied by the physical random access channels for performing frequency-division multiplexing to be less than a specified frequency domain bandwidth, and communication performance is improved.

In the example of the disclosure, the total bandwidth occupied by the PRACHs for performing frequency-division multiplexing may be less than a specified frequency domain bandwidth, so as to limit the bandwidth occupied by PRACHs for performing frequency-division multiplexing to be less than the specified frequency domain bandwidth.

In the example of the disclosure, the total bandwidth occupied by the PRACHs for performing frequency-division multiplexing may be determined according to a type of the terminal. In an example, for the Reduced capability UE, a total bandwidth occupied by the PRACHs for performing frequency-division multiplexing may be set to be less than the maximum receiving frequency domain bandwidth of the reduced capability UE. In another example, a total bandwidth occupied by the PRACHs for performing frequency-division multiplexing for common NR UE may be set based on the frequency domain bandwidth in the traditional configuration of PRACH FDM.

In the example of the disclosure, in order to facilitate description and distinguishing of different types of terminals, a first type terminal and a second type terminal are used to represent different types of terminals. Capabilities of the first type terminal and the second type terminal are different, for example, the capability of the first type terminal is lower than the capability of the second type terminal.

In the example of the disclosure, the first type terminal and the second type terminal may have different capabilities. For example, the capability of the terminal may be one or more of a transceiving bandwidth, a number of transceiving antennas, a maximum number of bits of transport blocks, and processing time delay. The capability of the terminal may vary from one or more of the transceiving bandwidth, the number of transceiving antennas, the maximum number of bits of transport blocks, and the processing time delay. In an example, the first type terminal may be a reduced capability UE, and the second type terminal may be an NR terminal, also called latency UE.

In the example of the disclosure, different configuration information of PRACH FDM may be configured for the first type terminal and the second type terminal respectively. It may also be understood that different first parameters are configured for the first type terminal and the second type terminal respectively, or that different total bandwidths occupied by the PRACHs for performing frequency-division multiplexing are configured for the first type terminal and the second type terminal respectively.

In the example of the disclosure, the specified frequency domain bandwidth may be a maximum receiving frequency domain bandwidth of one specified type of terminal. For example, the specified frequency domain bandwidth may be the maximum receiving frequency domain bandwidth of the first type terminal. That is, the total bandwidth occupied by the PRACHs for performing frequency-division multiplexing is less than the maximum receiving frequency domain bandwidth of the first type terminal.

In the example of the disclosure, the total bandwidth occupied by PRACH FDM may be determined according to the capability of the terminal, such that the total bandwidth occupied by PRACH FDM is less than the specified frequency domain bandwidth. For example, for the reduced capability UE, the adapted PRACH FDM configuration is determined, such that the PRACH FDM configuration may better match the capability of the reduced capability UE.

In the example of the disclosure, the frequency-division multiplexing method involved in the above example is described below in combination with practical application.

In an example of the example of the disclosure, a PRACH FDM factor for performing frequency-division multiplexing is limited to limit the bandwidth occupied by the PRACHs for performing frequency-division multiplexing. The PRACH FDM factor may be understood as the number of the PRACHs for performing frequency-division multiplexing.

In the example of the disclosure, the first parameter may include a set of numbers of PRACHs that support FDM, below referred to as a set of numbers of first PRACHs. For example, the set of the numbers of the first PRACHs in the example of the disclosure may include {1, 2, 4}. Alternatively, the set of the numbers of the first PRACHs may include {1, 2}.

In the example of the disclosure, the numbers of the PRACHs included in the set of the numbers of the first PRACHs represent that the number of the PRACHs for performing frequency-division multiplexing is less than a specified value. For example, the set of the numbers of the first PRACHs in the example of the disclosure may include {1, 2, 4}, so as to limit the number of the PRACHs for performing frequency-division multiplexing to be less than 4. Alternatively, the set of the numbers of the first PRACHs may include {1, 2}, so as to limit the number of the PRACHs for performing frequency-division multiplexing to be less than 2.

The set of the numbers of the first PRACHs in the example of the disclosure may be determined based on a set of numbers of PRACHs represented by the traditional PRACH FDM factor. For convenience of description, the set of the numbers of the PRACHs configured to determine the set of the numbers of the first PRACHs is referred to as a set of numbers of second PRACHs in the example of the disclosure.

In an example, the set of the numbers of the first PRACHs is a subset of the set of the numbers of the second PRACHs. For example, the set of the numbers of the second PRACHs is {1, 2, 4, 8}, and the set of the numbers of the first PRACHs may be {1, 2, 4} or {1, 2}.

In the example of the disclosure, the set of the numbers of the first PRACHs and/or the set of the numbers of the second PRACHs may be determined based on the type of the terminal. For instance, in the example of the disclosure, the set of the numbers of the first PRACHs is determined based on the first type terminal, that is, the set of the numbers of the first PRACHs corresponds to the first type terminal. In the example of the disclosure, the set of the numbers of the second PRACHs may also be determined based on the second type terminal. The set of the numbers of the second PRACHs corresponds to the second type terminal.

In the example of the disclosure, the capability of the first type terminal is lower than the capability of the second type terminal. For example, the first type terminal may be a reduced capability UE, and the second type terminal may be an NR terminal.

According to the frequency-division multiplexing method involved in the example of the disclosure, in an example, for a specified type of terminal, bandwidth of all PRACHs for performing frequency-division multiplexing may be limited. In an example, for the first type terminal, the bandwidth of all PRACHs for performing frequency-division multiplexing is limited. For example, for the reduced capability UE, the PRACH FDM factor is limited in all cases of frequency-division multiplexing. For example, the FDM factor supported by the PRACHs for performing frequency-division multiplexing is limited to {1, 2, 4} or {1, 2}. A set of available FDM factors for the traditional terminal is {1, 2, 4, 8}, and a set of the FDM factor for the reduced capability UE is {1, 2, 4}.

According to the frequency-division multiplexing method involved in the example of the disclosure, in another example, for a specified type of terminal, bandwidth of PRACHs for performing frequency-division multiplexing under some communication conditions may be limited. In an example, bandwidth of the PRACHs for performing frequency-division multiplexing corresponding to subcarrier spacing specified for the first type terminal is limited. For example, for the reduced capability UE, the PRACH FDM factor is limited under some communication conditions, for example, the number for FDM is limited when SCS=30 kHz and is not limited when SCS=15 kHz.

In an example, the first parameter includes a SCS parameter, the SCS parameter being configured to indicate a specified SCS. The specified SCS indicated by SCS parameter may be understood as the SCS requiring lamination on PRACH FDM factor. Alternatively, it may be understood that the total bandwidth occupied by the PRACHs for performing frequency-division multiplexing corresponding to SCS carried and indicated in the first parameter is determined.

In an example, the sets of the numbers of the first random access channels corresponding to different subcarrier spacing are different. For instance, when the PRACH SCS shown in Table 2 is 1.25 and 15, a corresponding set of the numbers of the first random access channels is {1, 2, 4, 8}, and when the PRACH SCS is 5, 30, 60 and 120, a corresponding set of the numbers of the first random access channels is {1, 2, 4}.

| PRACH SCS | Set of the numbers of the first random access channels |
|---|---|
| 1.25, 15 | 1, 2, 4, 8 |
| 5, 30, 60, 120 | 1, 2, 4 |

In another implementation of the example of the disclosure, a number of frequency resources occupied by each PRACH FDM for performing frequency-division multiplexing is limited, for example, a number of physical resource blocks (PRBs) is limited, to limit the bandwidth occupied by the PRACHs for performing frequency-division multiplexing.

In an implementation of the example of the disclosure, the first parameter includes the number of frequency resources occupied by each PRACH respectively corresponding to different subcarrier spacing, below referred to as the number of first frequency resources. The number of the first frequency resources in the example of the disclosure may be understood as the number of the frequency resources that limit the number of the frequency resources occupied by each PRACH.

In the example of the disclosure, the number of first frequency resources may be determined based on a number of frequency resources of a traditional terminal (such as an NR terminal). For the convenience of description, the number of frequency resources used to determine the number of the first frequency resources is referred to as the number of second frequency resources in the example of the disclosure.

In an example, the number of the first frequency resources is less than the number of second frequency resources.

In the example of the disclosure, the number of the first frequency resources and/or the number of the second frequency resources may be determined based on the type of the terminal. For instance, in the example of the disclosure, the number of the first frequency resources is determined based on the first type terminal, that is, the number of the first frequency resources corresponds to the first type terminal. In the example of the disclosure, the number of the second frequency resources may also be determined based on the second type terminal. The number of the second frequency resources corresponds to the second type terminal.

In the example of the disclosure, the capability of the first type terminal is lower than the capability of the second type terminal. For example, the first type terminal may be a reduced capability UE, and the second type terminal may be an NR terminal.

In the example of the disclosure, the number of the first frequency resources configured to limit the bandwidth occupied by the PRACHs for performing frequency-division multiplexing may be directly carried in the first parameter. The first parameter may be a pre-configured message. For example, in the example of the disclosure, the number of frequency resources occupied by each PRACH under different PRACH SCS and the PUSCH SCS may be defined in a protocol. For example, the number of PRBs occupied by each PRACH for the reduced capability UE is half of the number of PRBs occupied by each PRACH for a normal NR terminal.

The number of the first frequency resources used to limit the bandwidth occupied by the PRACHs for performing frequency-division multiplexing in the example of the disclosure may be represented by a scaling factor. In an example, the first parameter includes the scaling factor, the scaling factor being configured to represent the ratio of the number of the first frequency resources to the number of second frequency resources. The first parameter including the scaling factor in the example of the disclosure may be carried by broadcast signaling. For instance, when a scaling factor "a" is notified by the broadcast signaling, then for the reduced capability UE, each PRACH resource occupied by each PRACH equals to a×PRACH resources corresponding to normal users. And the scaling factor "a" can be understood as a value less than 1 and greater than 0. For instance, for the reduced capability UE, the number of the PRBs occupied by each PRACH equals to a×the number of PRBs occupied by each PRACH corresponding to NR terminals.

In the example of the disclosure, different frequency-division multiplexing solutions are configured for different types of terminals, such that the frequency-division multiplexing method may match the capability of the terminal, and communication performance is improved.

It is needed to be noted that those skilled in the art can understand that the above implementations/instances of the examples of the disclosure can be used in conjunction with the aforementioned examples or independently according to similar implementation principles. In the example of the disclosures, some examples are described as being used together. Those skilled in the art can understand that such illustration is not limitation to the examples of the disclosure.

In some examples of the disclosure, a frequency-division multiplexing method is provided and includes:

a set of numbers of first random access channels corresponding to a first type UE is determined, and a set of numbers of second random access channels corresponding to a second type UE is determined, where the numbers of the random access channels included in the set of the numbers of the first random access channels is a proper subset of the numbers of random access channels included in the set of the numbers of second random access channels.

The first type UE is different from the second type UE.

In the above example, the set of the numbers of first random access channels is determined for all the first type UE different from the second type UE.

In some examples of the disclosure, the capability of the first type terminal is lower than the capability of the second type terminal. For example, the first type terminal may be a reduced capability UE, and the second type terminal may be an NR terminal.

According to the frequency-division multiplexing method involved in the example of the disclosure, in an example, for a specified type of terminal, bandwidth of all PRACHs for performing frequency-division multiplexing may be limited, so as to generate the set of the numbers of the first random access channels. In an example, for the first type terminal, the bandwidth of the PRACHs for performing frequency-division multiplexing is limited. For example, for the reduced capability UE, the PRACH FDM factor is limited in all cases of frequency-division multiplexing. For example, the FDM factor supported by the PRACHs for performing frequency-division multiplexing is limited to {1, 2, 4} or {1, 2}. Then a set of available FDM factors for the traditional terminal is {1, 2, 4, 8}, and a set of the FDM factors for the reduced capability UE is {1, 2, 4}.

In some examples, the set of the numbers of the first random access channels corresponding to the first type UE is an FDM factor supported by the PRACHs for performing frequency-division multiplexing for reduced capability UE, and may be {1, 2, 4}, for example. In some examples, the set of the numbers of the second random access channels corresponding to the second type UE is an FDM factor supported by the PRACHs for performing frequency-division multiplexing for NR UE, and may be {1, 2, 4, 8}, for example.

Specifically, reference can be made to details described in any previous example, and the same technical content will not be repeated here.

In some examples of the disclosure, a frequency-division multiplexing method is provided and includes:

a set of numbers of first random access channels corresponding to a first type UE satisfying a first condition is determined, and a set of numbers of second random access channels corresponding to a second type UE is determined, where the numbers of the random access channels included in the set of the numbers of the first random access channels is a proper subset of the numbers of random access channels included in a set of the numbers of second random access channels.

The first type UE is different from the second type UE.

In the above example, the set of the numbers of first random access channels is determined for the first type UE satisfying the first condition and being different from the second type UE.

In some examples of the disclosure, the capability of the first type terminal is lower than the capability of the second type terminal. For example, the first type terminal may be a reduced capability UE, and the second type terminal may be an NR terminal.

In an example of the frequency-division multiplexing method involved in the example of the disclosure, for some of the first type UE, bandwidth of PRACHs for performing frequency-division multiplexing may be limited, so as to generate the set of the numbers of the first random access channels. For example, the first condition may be a subcarrier spacing (SCS) parameter of the first type UE. For example, when the subcarrier spacing SCS of the reduced capability UE equals to 30 MHz, the bandwidth of the PRACHs for performing frequency-division multiplexing is limited. When the subcarrier spacing SCS of the reduced capability UE does not equal to 30 MHz, the first type UE is applied with the same bandwidth of the PRACHs for performing frequency-division multiplexing as the second type UE; that is, when SCS/30 MHz, the bandwidth of the PRACHs for performing frequency division multiplexed is not limited.

Specifically, reference can be made to details described in any previous example, and the same technical content will not be repeated here.

In some examples of the disclosure, a frequency-division multiplexing method is provided and includes:

determining a set of numbers of frequency resources occupied by PRACH FDM corresponding to a first type UE and/or a set of numbers of frequency resources occupied by PRACH FDM corresponding to a second type UE.

The first type UE is different from the second type UE.

In some examples of the disclosure, the capability of the first type terminal is lower than the capability of the second type terminal. For example, the first type terminal may be a reduced capability UE, and the second type terminal may be an NR terminal.

In the example of the disclosure, the same set of the number of frequency resources occupied by PRACH FDM may be used for the first type UE and the second type UE. Specifically, the set of frequency resources occupied by PRACH FDM includes the number of frequency resources corresponding to different subcarrier spacing, such that the number of frequency resources may be determined for each subcarrier spacing already determined in a communication protocol. In some examples of the disclosure, the number of frequency resources respectively corresponding to each subcarrier spacing varies. In some examples of the disclosure, some different subcarrier spacing corresponds to the same number of frequency resources. For example, when SCS=15 MHz, the first type UE and the second type UE correspond to the number of first frequency resources. When SCS=30 MHz, the first type UE and the second type UE correspond to the number of second frequency resources, and the number of the first frequency resources does not equal to the number of the second frequency resources.

Specifically, reference can be made to details described in any previous example, and the same technical content will not be repeated here.

In some examples of the disclosure, a frequency-division multiplexing method is provided and includes:

determining a set of numbers of frequency resources occupied by PRACH FDM corresponding to a first type UE and a set of numbers of frequency resources occupied by PRACH FDM corresponding to second type UE. For the same subcarrier spacing, the number of frequency resources occupied by PRACH FDM corresponding to the first type UE is less than or equal to the number of frequency resources occupied by PRACH FDM corresponding to the second type UE.

The first type UE is different from the second type UE.

In the example of the disclosure, for the same subcarrier spacing, the first type UE and the second type UE use different sets of the numbers of frequency resources occupied by PRACH FDM. For example, the first type UE may correspond to the scaling parameter a. When setting the subcarrier spacing a, the number of frequency resources occupied by the PRACH FDM corresponding to the first type UE is A1, and the number of frequency resources occupied by the PRACH FDM corresponding to the second type UE is A2, then A1=α×A2; where α≤1. That is, for the same subcarrier spacing, the number of frequency resources corresponding to the first type UE is a times the number of subcarrier resources corresponding to the second type UE. For different subcarrier spacing, the same scaling parameter a may be used, or different scaling parameters a may be used. Using the scaling parameter a is a relatively simple and easy manner. In the example of the disclosure, the number of frequency resources may also be set for each subcarrier spacing corresponding to the first type UE and each subcarrier spacing corresponding to the second type UE, and the number of these frequency resources may be that same or different.

Specifically, reference can be made to details described in any previous example, and the same technical content will not be repeated here.

Based on the same concept, the example of the disclosure further provides a frequency-division multiplexing apparatus.

It can be understood that in order to achieve the above functions, the frequency-division multiplexing apparatus provided in the example of the disclosure includes corresponding hardware structures and/or software modules for executing the functions. The example of the disclosure may be implemented in hardware or a combination of hardware and computer software, in combination with units and algorithm steps of each instance disclosed in the example of the disclosure. Whether a function is executed by hardware or computer software-driven hardware depends on particular application of the technical solution and design constraints. Those skilled in the art can use different methods to implement the described functions for each particular application, but such implementation should not be considered to be beyond the scope of the technical solution of the example of the disclosure.

FIG. 3 is a block diagram of a frequency-division multiplexing apparatus according to an example. With reference to FIG. 3, the frequency-division multiplexing apparatus 100 includes a processing unit 101.

The processing unit 101 is configured to determine a first parameter, where the first parameter is configured to determine a total bandwidth occupied by PRACHs for performing frequency-division multiplexing.

In an example, the first parameter includes a set of numbers of the first PRACHs that support frequency-division multiplexing.

In an example, the set of the numbers of the first PRACHs is a subset of the set of numbers of the second PRACHs.

In an example, the set of the numbers of the first PRACHs corresponds to a first type terminal, and the set of the numbers of the second PRACHs corresponds to a second type terminal. The capability of the first type terminal is lower than the capability of the second type terminal.

In an example, the first parameter includes a subcarrier spacing parameter, the subcarrier spacing parameter being configured to indicate a specified subcarrier spacing.

In an example, the sets of the numbers of the first random access channels corresponding to different subcarrier spacing are different.

In an example, the first parameter includes the number of first frequency resources occupied by each PRACH respectively corresponding to different subcarrier spacing.

In an example, the number of the first frequency resources is less than the number of second frequency resources.

In an example, the number of the first frequency resources corresponds to a first type terminal, and the number of the second frequency resources corresponds to a second type terminal. The capability of the first type terminal is lower than the capability of the second type terminal.

In an example, the first parameter includes the scaling factor, the scaling factor being configured to represent the ratio of the number of the first frequency resources to the number of second frequency resources.

In an example, the total bandwidth occupied by the physical random access channels for performing frequency-division multiplexing is less than a maximum receiving frequency domain bandwidth of the first type terminal.

Regarding the apparatus in the above example, a specific manner in which each module executes operation has been described in detail in an example related to the method, and will not described in detail here.

FIG. 4 is a block diagram of a frequency-division multiplexing apparatus 200 according to an example. For example, the apparatus 200 may be a mobile phone, a computer, a digital broadcast terminal, a message transceiving device, a game console, a tablet device, a medical device, a fitness device, a personal digital assistant, etc.

With reference to FIG. 4, the apparatus 200 may include one or more of a processing assembly 202, a memory 204, a power assembly 206, a multimedia assembly 208, an audio assembly 210, an input/output (I/O) interface 212, a sensor assembly 214, and a communication assembly 216.

The processing assembly 202 generally controls overall operation of the apparatus 200, for instance, operations associated with display, phone calls, data communications, camera operations, and recording operations. The processing assembly 202 may include one or more processors 220 to execute an instruction, so as to complete all or part of the steps of the above method. In addition, the processing assembly 202 may include one or more modules to facilitate interactions between the processing assembly 202 and other assemblies. For example, the processing assembly 202 may include a multimedia module, so as to facilitate interactions between the multimedia assembly 208 and the processing assembly 202.

The memory 204 is configured to store various types of data to support the operation of the apparatus 200. Instances of such data include an instruction, operated on the apparatus 200, for any application or method, contact data, phonebook data, messages, pictures, video, etc. The memory 204 may be implemented by any type of volatile or non-volatile memory apparatus, or their combination, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 206 energizes various components of the apparatus 200. The power component 206 may include a power management system, one or more power supplies, and other components associated with generating, managing, and distributing power for the apparatus 200.

The multimedia component 208 includes a screen providing an output interface between the apparatus 200 and a user. In some examples, the screen may include a liquid crystal display (LCD) and a touch panel (TP). If including the TP, the screen may be implemented as a touch screen to receive an input signal from a user. The TP includes one or more touch sensors to sense touch, swipe, and gestures on the TP. The touch sensors may not only sense a boundary of a touch or swipe action, but also detect a time of duration and a pressure associated with the touch or swipe action. In some examples, the multimedia assembly 208 includes a front facing camera and/or a rear facing camera. When the apparatus 200 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio assembly 210 is configured to output and/or input an audio signal. For example, the audio assembly 210 includes a microphone (MIC) configured to receive an external audio signal when the apparatus 200 is in the operation mode, such as a call mode, a recording mode, and a voice recognition mode. The received audio signals may be further stored in the memory 204 or transmitted via the communication component 216. In some examples, the audio component 210 may further include a speaker to output audio signals.

The I/O interface 212 provides an interface between the processing component 202 and peripheral interface modules, which may be keyboards, click wheels, buttons, etc. These button may include, but are not limited to, a home button, a volume button, a start button, and a lock button.

The sensor component 214 includes one or more sensors configured to provide various aspects of state assessment for the apparatus 200. For example, the sensor component 214 may detect an on/off status of the apparatus 200, and relative positioning of components. For example, the component is a display and a keypad of the apparatus 200. The sensor component 214 may also detect a change in position of the apparatus 200 or a component of the apparatus 200, presence or absence of user contact with the apparatus 200, an orientation or an acceleration/deceleration of the apparatus 200, and a change in temperature of the apparatus 200. The sensor component 214 may include a proximity sensor configured to detect the presence of objects nearby without any physical contact. The sensor component 214 may also include light sensors, such as complementary metal-oxide-semiconductor transistor (CMOS) or charge coupled device (CCD) image sensors, for use in imaging applications. In some examples, the sensor component 214 may also include an acceleration sensor, a gyroscope sensor, a magnetic sensor, a pressure sensor, or a temperature sensor.

The communication component 216 is configured to facilitate wired or wireless communications between the apparatus 200 and other devices. The apparatus 200 may access a wireless network based on a communication standard, such as WiFi, the 2nd generation mobile communication technology (2G) or the 3rd generation mobile communication technology (3G), or their combination. In an example, the communication assembly 216 receives a broadcast signal or broadcast related information from an external broadcast management system via a broadcast channel. In an example, the communication assembly 216 also includes a near field communication (NFC) module to facilitate short-range communication. For example, the NFC module may be implemented on the basis of a radio frequency identification (RFID) technology, an infrared data association (IrDA) technology, an ultra wide band (UWB) technology, a Bluetooth (BT) technology, etc.

In an example, the apparatus 200 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor, or other electronic elements for executing the method above.

In an example, further provided is a non-transitory computer-readable storage medium including an instruction, for example, a memory 204 including an instruction, and the instruction may be executed by the processor 220 of the apparatus 200 so as to execute the method described above. For instance, the non-transitory computer-readable storage medium may be a read-only memory (ROM), a random access memory (RAM), a compact disc read-only memory (CD-ROM), a magnetic tape, a floppy disk, an optical data storage apparatus, etc.

Figure 5:
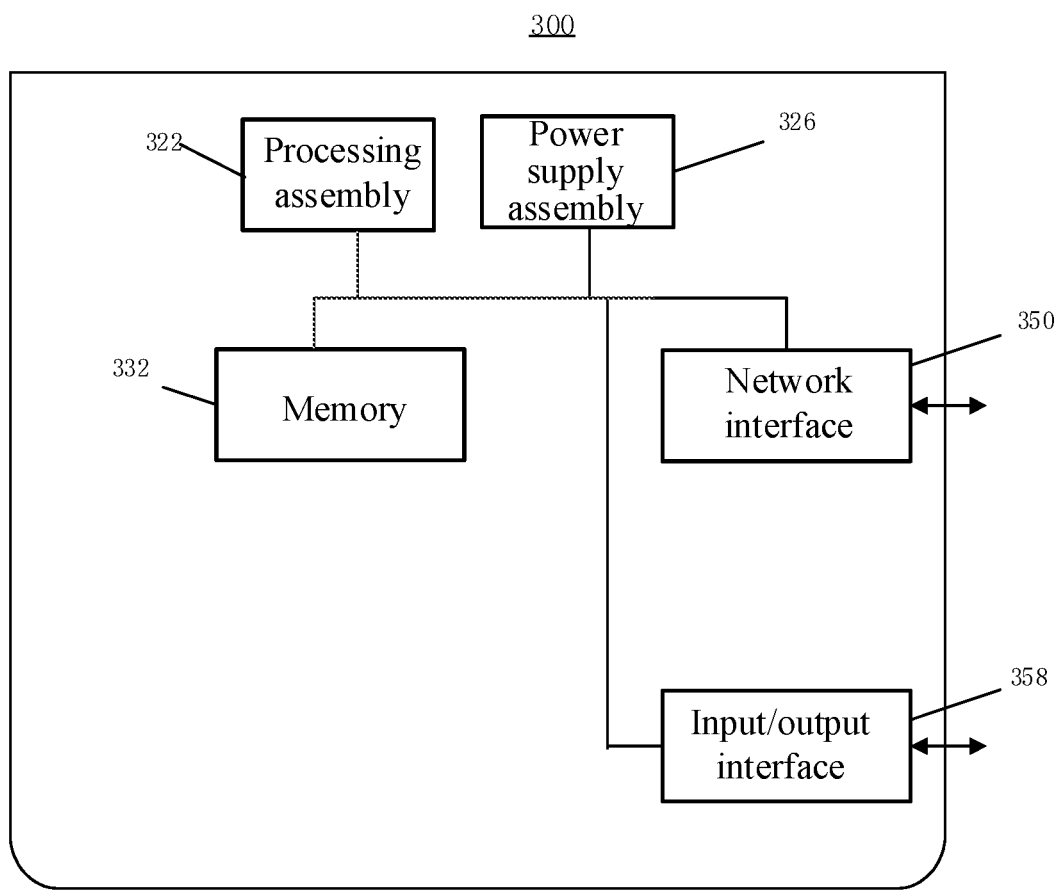
FIG. 5 is a block diagram of a frequency-division multiplexing apparatus according to an example.

FIG. 5 is a block diagram of a frequency-division multiplexing apparatus 300 according to an example. For example, the apparatus 300 may be provided as a server. With reference to FIG. 5, the apparatus 300 includes a processing assembly 322 and further includes one or more processors, and a memory resource represented by a memory 332 for storing instructions, such as applications that may executed by the processing assembly 322. The applications stored in the memory 332 may include one or more modules that each correspond to a set of instructions. Further, the processing assembly 322 is configured to execute the instructions to implement the above method.

The apparatus 300 may further include a power supply assembly 326 configured to implement power supply management of the apparatus 300, a wired or radio network interface 350 configured to connect the apparatus 300 to a network, and an input/output (I/O) interface 358. The apparatus 300 may operate an operating system stored in the memory 332, such as Windows Server™, Mac OS X™, Unix™, Linux™ and FreeBSD™.

In an example, further provided is a non-transitory computer-readable storage medium including an instruction, for instance, a memory 332 including an instruction, and the instruction may be executed by the processor 322 of the apparatus 300 so as to execute the method above. For example, the non-transitory computer-readable storage medium may be an ROM, RAM, a compact disk (CD)-ROM, a magnetic tape, a floppy disk, an optical data storage device, etc.

It can be further understood that in the disclosure, "plurality" refers to two or more, and other quantifiers are analogous to this. "and/or" is used to describe an associated relationship between associated objects and means three relationships, for instance, A and/or B can mean A alone, A and B together, and B alone. The character "/" generally indicates that the associated objects are in an "or" relationship. Singular forms "a", "an" and "the" are intended to include plural forms as well, unless the context clearly indicates otherwise.

It can be further understood that the terms "first", "second", etc. are used to describe various information, but the information should not be limited by these terms. These terms are used to distinguish the same type of information from each other and do not denote a particular order or degree of importance. Indeed, the expressions "first", "second", etc. can be used interchangeably. For instance, first information can also be referred to as second information, and similarly, second information can also be referred to as first information, without departing from the scope of the disclosure.

It can be further understood that in examples of the disclosure, while operations are depicted in the accompanying drawings in a particular order, it should not be understood as requiring that such operations be executed in the particular order shown or in serial order, or that all illustrated operations be executed, to achieve desirable results. In some circumstances, multitasking and parallel processing can be advantageous.

Those skilled in the art could easily conceive of other examples of the disclosure upon consideration of the description and the disclosure here. The disclosure is intended to cover variations, uses, or adaptations of the disclosure, and these variations, uses, or adaptations follow general principles of the disclosure and include common general knowledge or customary technical means in the technical field not disclosed in the disclosure. The description and examples are considered as illustrative only, and a true scope and spirit of the disclosure are indicated by the following claims.

It should be understood that the disclosure is not limited to precise structures described above and shown in the accompanying drawings, and various modifications and changes can be made without departing from the scope of the disclosure. The scope of the disclosure is limited by the appended claims.

What is claimed is:

1. A frequency-division multiplexing method, comprising:
   determining a first parameter, wherein the first parameter is configured to determine a total bandwidth occupied by physical random access channels for performing frequency-division multiplexing, the first parameter comprises a number of first frequency resources occupied by each of physical random access channels respectively corresponding to different subcarrier spacings;
   the number of first frequency resources is less than a number of second frequency resources, for the same subcarrier spacing, wherein the number of first frequency resources corresponds to a first type terminal, and the number of second frequency resources corresponds to a second type terminal, a capability of the first type terminal is lower than a capability of the second type terminal.

2. The frequency-division multiplexing method according to claim 1, wherein the first parameter comprises a first set of numbers, wherein each of the numbers in the first set represents a number of first physical random access channels for performing frequency-division multiplexing.

3. The frequency-division multiplexing method according to claim 2, wherein the first set of numbers of the first physical random access channels is a subset of a set of numbers of second physical random access channels, wherein the set of numbers of second physical random access channels comprises a second set of numbers, wherein each of the numbers in the second set represents a number of second physical random access channels for performing frequency-division multiplexing.

4. The frequency-division multiplexing method according to claim 3, wherein the first set of the numbers of the first physical random access channels corresponds to the first type terminal, and the second set of the numbers of the second physical random access channels corresponds to the second type terminal; and
   a capability of the first type terminal is lower than a capability of the second type terminal.

5. The frequency-division multiplexing method according to claim 2, wherein the first parameter comprises a subcarrier spacing parameter, the subcarrier spacing parameter being configured to indicate a specified subcarrier spacing.

6. The frequency-division multiplexing method according to claim 5, wherein the first set of the numbers of the first random access channels corresponding to different subcarrier spacing are different.

7. The frequency-division multiplexing method according to claim 1, wherein the first parameter comprises a scaling factor, the scaling factor being configured to represent the ratio of the number of the first frequency resources to the number of the second frequency resources.

8. The frequency-division multiplexing method according to claim 1, wherein the total bandwidth occupied by the physical random access channels for performing frequency-division multiplexing is less than a maximum receiving frequency domain bandwidth of the first type terminal.

9. The frequency-division multiplexing method according to claim 1, wherein the capability of a terminal comprises one or more of: a transceiving bandwidth, a number of transceiving antennas, a maximum number of bits of transport blocks, and processing time delay.

10. The frequency-division multiplexing method according to claim 1, wherein frequency resources comprise physical resource blocks (PRBs).

11. The frequency-division multiplexing method according to claim 1, wherein the first parameter is carried in a pre-configured message.

12. The frequency-division multiplexing method according to claim 7, wherein the first parameter comprising the scaling factor is carried in broadcast signaling.

13. A frequency-division multiplexing apparatus, comprising:
   a processor; and
      a memory configured to store an instruction executable by the processor;
   the processor being configured to:
      determine a first parameter, wherein the first parameter is configured to determine a total bandwidth occupied by physical random access channels for performing frequency-division multiplexing, the first parameter comprises a number of first frequency resources occupied by each of physical random access channels respectively corresponding to different subcarrier spacings;
      the number of first frequency resources is less than a number of second frequency resources, for the same subcarrier spacing, wherein the number of first frequency resources corresponds to a first type terminal, and the number of second frequency resources corresponds to a second type terminal, a capability of the first type terminal is lower than a capability of the second type terminal.

14. The frequency-division multiplexing apparatus according to claim 13, wherein the first parameter comprises a first set of numbers, wherein each of the numbers in the first set represents a number of first physical random access channels for performing frequency-division multiplexing.

15. The frequency-division multiplexing apparatus according to claim 14, wherein the first set of numbers of the first physical random access channels is a subset of a set of numbers of second physical random access channels, wherein the set of numbers of second physical random access channels comprises a second set of numbers, wherein each of the numbers in the second set represents a number of second physical random access channels for performing frequency-division multiplexing.

16. The frequency-division multiplexing apparatus according to claim 14, wherein the first parameter comprises a subcarrier spacing parameter, the subcarrier spacing parameter being configured to indicate a specified subcarrier spacing.

17. The frequency-division multiplexing apparatus according to claim 13, wherein the total bandwidth occupied by the physical random access channels for performing frequency-division multiplexing is less than a maximum receiving frequency domain bandwidth of the first type terminal.

18. The frequency-division multiplexing apparatus according to claim 13, wherein the first parameter comprises a scaling factor, the scaling factor being configured to represent the ratio of the number of the first frequency resources to the number of the second frequency resources.

19. A non-transitory computer-readable storage medium storing instructions, wherein the instructions, when executed by a processor, cause the processor to perform a method comprising:

determining a first parameter, wherein the first parameter is configured to determine a total bandwidth occupied by physical random access channels for performing frequency-division multiplexing, the first parameter comprises a number of first frequency resources occupied by each of physical random access channels respectively corresponding to different subcarrier spacings;

the number of first frequency resources is less than a number of second frequency resources, for the same subcarrier spacing, wherein the number of first frequency resources corresponds to a first type terminal, and the number of second frequency resources corresponds to a second type terminal, a capability of the first type terminal is lower than a capability of the second type terminal.

* * * * *